United States Patent [19]

De'Ath

[11] Patent Number: 4,881,884

[45] Date of Patent: Nov. 21, 1989

[54] APPARATUS FOR INJECTION MOULDING

[75] Inventor: Roderick M. De'Ath, Oxfordshire, England

[73] Assignee: MB Group plc, Reading, England

[21] Appl. No.: 227,907

[22] PCT Filed: Nov. 25, 1987

[86] PCT No.: PCT/GB87/00842

§ 371 Date: Aug. 1, 1988

§ 102(e) Date: Aug. 1, 1988

[87] PCT Pub. No.: WO88/04227

PCT Pub. Date: Jun. 16, 1988

[30] Foreign Application Priority Data

Dec. 5, 1986 [GB] United Kingdom ............... 8629124

[51] Int. Cl.⁴ .................. B29C 45/40; B29C 45/14; B29C 33/44

[52] U.S. Cl. .................. 425/117; 249/66.1; 249/83; 249/161; 425/127; 425/547; 425/556; 425/588; 425/436 R

[58] Field of Search ............ 249/160, 83, 161, 85, 249/119, 120; 425/572, 588, 116, 117, 129.1, 127, 554, 556, 547; 264/328, 16

[56] References Cited

U.S. PATENT DOCUMENTS

| | | | |
|---|---|---|---|
| 2,655,692 | 10/1953 | Fay | 249/119 |
| 3,360,829 | 1/1968 | Germ | 249/120 |
| 4,109,343 | 8/1978 | Weis et al. | 29/148.4 A |
| 4,140,451 | 2/1979 | Herdzina, Jr. et al. | 425/129.1 |
| 4,165,959 | 8/1979 | Dechavanne | 425/556 |
| 4,340,561 | 7/1982 | Cretin et al. | 425/556 |
| 4,372,740 | 2/1983 | Kuramochi et al. | 425/588 |
| 4,416,604 | 11/1983 | Bender et al. | 425/572 |
| 4,456,576 | 6/1984 | Cotte | 425/112 |
| 4,711,621 | 12/1987 | Schomblond | 249/161 |
| 4,776,447 | 10/1988 | Pitcher | 198/394 |
| 4,779,835 | 10/1988 | Fukushima et al. | 425/588 |

FOREIGN PATENT DOCUMENTS

| | | |
|---|---|---|
| 0036763 | 9/1981 | European Pat. Off. . |
| 0041004 | 12/1981 | European Pat. Off. . |
| 889515 | 1/1944 | France . |
| 1498338 | 9/1967 | France . |
| 57-120425 | 7/1982 | Japan . |
| 59-133030 | 7/1984 | Japan . |
| 2073651 | 10/1981 | United Kingdom . |

Primary Examiner—Willard Hoag
Attorney, Agent, or Firm—Burns, Doane, Swecker & Mathis

[57] ABSTRACT

An apparatus for injection moulding plastics closure elements into apertures in the central panels of a plurality of can ends comprises a first mould tool, a second mould tool, and a mechanism for bringing the mould tools together to clamp on opposed surfaces of each central panel and thereby define a mould cavity enclosing a margin of panel material around the aperture and spanning both sides of the aperture. A passageway in at least one of the moulded tools permits injection of plastics material into the mould cavity. The first mould tool includes a plurality of cavity defining mould portions each slidably guided in a respective bore in the first mould tool and a resilient support in each bore to urge each mould portion towards the second mould tool. A stripper plate surrounds the mould inserts and is formed with an annular recess situated laterally outside of and around each insert to receive the outer circumference of a can end to properly locate the can end.

9 Claims, 3 Drawing Sheets

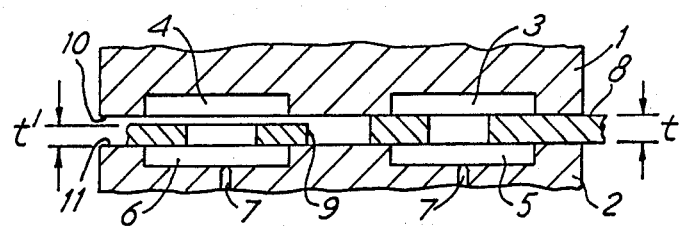
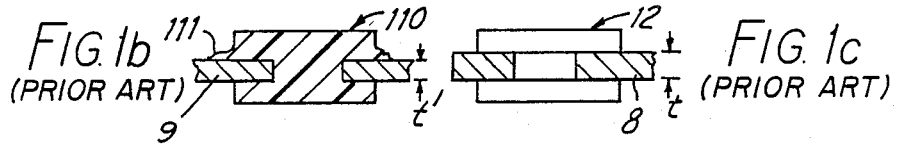
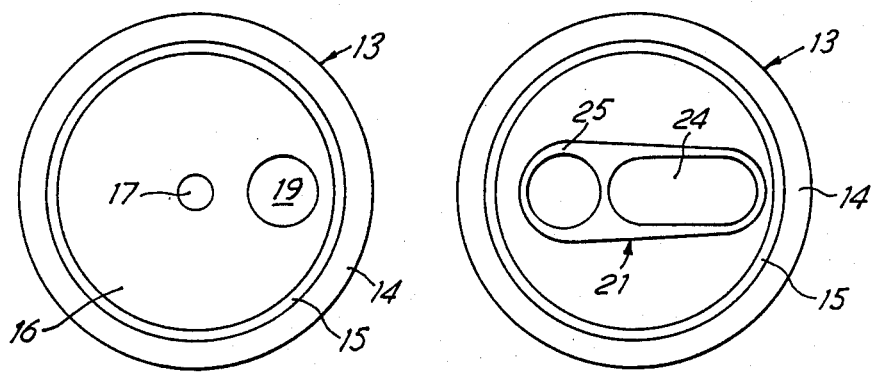
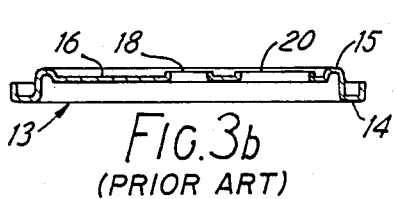
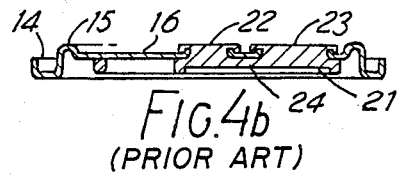

APPARATUS FOR INJECTION MOULDING

FIELD OF THE INVENTION

This invention relates to an array of moulding tools, each adapted to mould a plastics closure onto a metal can end.

DESCRIPTION OF THE PRIOR ART

British Pat. No. 2073646 describes a method of moulding a plastics plug into an aperture defined by a metal can end. The metal can end is clamped between an upper mould and a lower mould and plastics material is injected into mould cavities to form a plastics plug having a ring pull portion on one side of the can end and a sealing annulus on the other side. In order to prevent flash emerging from the mould cavities to render the mouldings unsightly or unusable, it is necessary to clamp the can end material tightly. However, it is in the nature to common sheet metals to vary by plus or minus 7% in thickness so that a mechanical clamping system actuating a moulding press will clamp thinner can ends less tightly than thicker can ends. This problem is increased if the moulding press incorporates an array of moulding tools distributed across a press platen because the first tools to clamp upon a thick metal will hold tools with thin metal therein apart.

SUMMARY OF THE INVENTION

According to the present invention there is provided apparatus for injection moulding plastics closure elements into apertures in the central panels of a plurality of can ends, said apparatus comprising, a first mould tool; a second mould tool; means effective to bring the mould tools together to clamp on opposed surfaces of each central panel and thereby define a mould cavity enclosing a margin of panel material around the aperture and spanning both sides of said aperture; and a passageway in at least one of the mould tools to permit injection of plastics material into said mould cavity, wherein, the first mould tool includes a plurality of cavity defining mould portions each slidably guided in a respective bore in said first mould tool and resilient support means in each bore to urge each said mould portion towards the second mould tool; and the second mould tool includes a plurality of mould inserts each defining a cavity to cooperate with a cavity of a mould position in the first tool, so that upon closing of the first mould tool to the second mould tool any mould portion closing upon a relatively thick can end panel will be urged, by the cooperating insert, to retract into its bore and permit clamping of a relatively thin can end panel between another mould portion and its cooperating mould insert, and sealing of all the moulds will be established before plastics material is injected into the mould cavity.

The clamping means may be resiliently supported on a spring or stack of Belville washers.

Alternatively, the clamping means may be resiliently supported on pressurised fluid, such as oil or compressed air.

DESCRIPTION OF THE DRAWINGS

Various embodiments will now be described by way of example and with reference to the accompanying drawings in which:

FIG. 1a is a diagrammatic sectional side view of a simplified injection moulding apparatus showing the problem to be overcome;

FIG. 1b is a sectional side view of a defective moulding produced by the apparatus of FIG. 1a;

FIG. 1c is a sectional side view of a satisfactory moulding produced by the apparatus of FIG. 1a;

FIG. 3a is a plan view and FIG. 3b a sectional side view of the can end as fed to the apparatus of FIG. 2 or FIG. 5;

FIG. 4a is a plan view and FIG. 4b is a sectioned side view of the can end after moulding of a plastics plug therein;

DESCRIPTION OF A PREFERRED EMBODIMENT OF THE INVENTION

Figure 2:
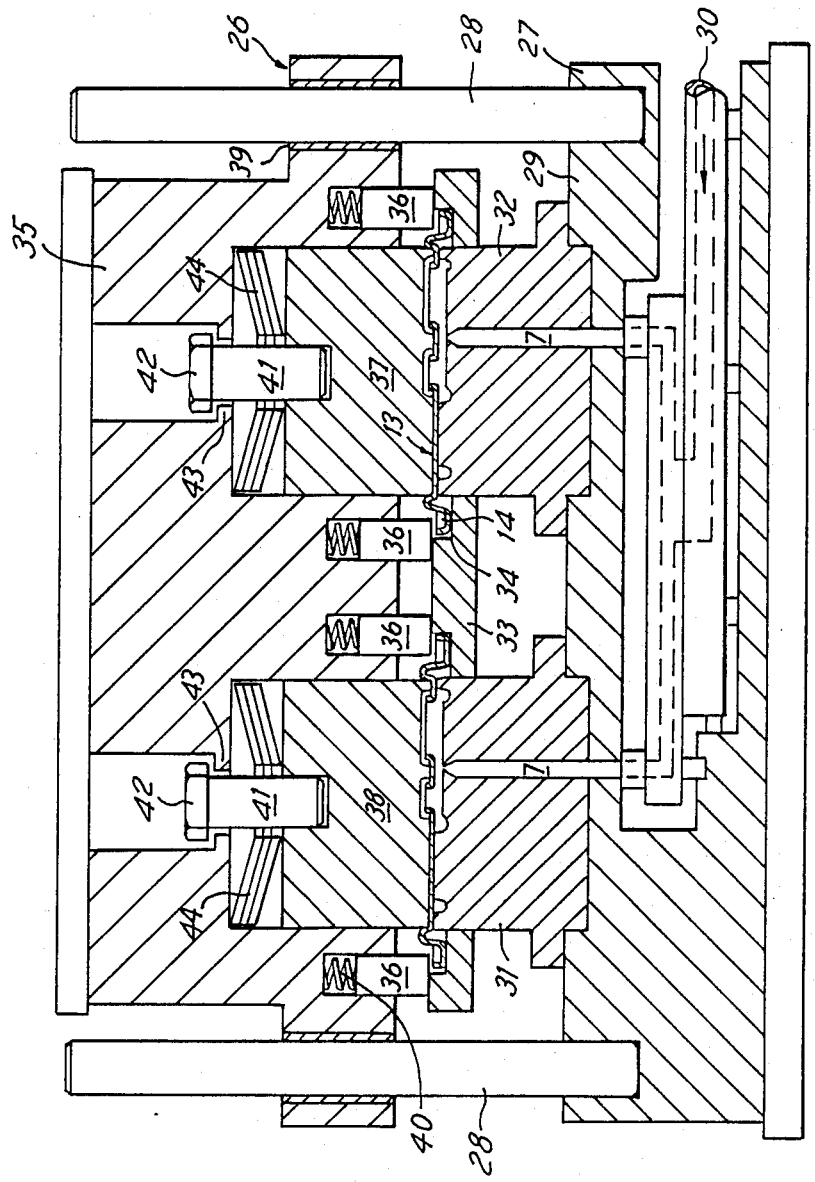
FIG. 2 is a sectioned side view of a first embodiment of apparatus for moulding a plastics plug into a can end.

FIG. 1a shows a simplified apparatus for injection moulding a flanged plug of plastics material into an aperture in a sheet material. The apparatus comprises an upper tool 1 and a lower tool 2 which may be moved by a press (not shown) to clamp sheer material therebetween.

The upper tool 1 has a first cavity 3 and a second cavity 4. The lower tool has a first mould cavity 5 aligned with cavity 3 and a second mould cavity 6 aligned with cavity 4. Each of the mould cavities 5, 6 has a passageway 7 for injecting plastics material.

In FIG. 1a the upper tool 1 and lower tool 2 have been brought to clamp upon two pieces of sheet material 8, 9 each piece having an aperture therein.

The piece of material 8 is of thickness "t" and is clamped tightly between the flat surface 10 of the upper die 1 and flat surface 11 of the lower die. The piece of material 9 is of a thickness t somewhat less than t so that the upper tool 1 and lower tool 2 are unable to clamp upon it because the thicker material of piece 8 holds the tools apart.

FIG. 1b shows a plug 110 after moulding by the cavities 4, 6 and it will be seen that the shape of the moulded plastics plug 110 is spoiled by a peripheral flash 111 that has spread across the face of the piece of sheet metal 9 because the mould cavities 4, 6 could not close properly.

In contrast FIG. 1c shows a properly moulded plug 12 after moulding in cavities, 3, 5 onto the piece of sheet material 4b.

The force required to clamp the upper tool 1 and lower tool 2 together must be large enough to prevent leakage of the plastics material under injection pressures. It is known for the moulds to be held together by mechanical means that are not resilient so that even if a single pair of tools is used variations in thickness of sheet material will give rise to a risk of clamping insufficient to prevent leakage of flash.

Sheet metals such as aluminium and its alloys, tinplate or chrome treated steels called T.F.S. are sold at a thickness tolerance of +7%; typical target thicknesses are in the range of 0.005" to 0.015" for packaging articles. It is desirable that this variation in thickness be coped with by the insert or outsert moulding apparatus.

FIGS. 3a and 3b show, by way of example, a can end shell 13 stamped from a nominally 0.010" thick sheet of chrome treated steel. The shell comprises a peripheral cover hook 14, an antipeaking bead 15 and a flat central panel 16 supported within the antipeaking bead. A central aperture 17 defined by a first annular flange 18, and an offset aperture 19 defined by a second annular flange 20, penetrate the flat central panel. Such can end shells are usually lacquered on the flanged side but may if desired be stamped from a laminate of sheet metal and a film of plastics material.

FIGS. 4c and 4b show the can end shell of FIGS. 3a, 3b after insert moulding of a closure 21 of plastics material onto the shell. The closure 21 has a first plug portion 22 closing the central aperture and a second plug portion 23 closing the offset aperture. The plug portions 22, 23 are joined on the topside of the can end by a flap 24 which has diverging side members connecting with a ring pull 25 at one end.

FIG. 2 shows a first embodiment of apparatus for moulding the plastics closure 21 onto the can end shell 13. In FIG. 2 the apparatus comprises an upper tool 26, a lower tool 27 and guide rods 28 which are rooted in the tool 27 and serve to align the upper tool 26 and lower tool during opening and closing of the tools by a press mechanism (not shown).

The lower tool includes a hollow block 29 in which a hot runner 30 extends to convey plastics material into each of two lower mould inserts 31, 32. Each lower mould insert has a passage for entry of plastics material to a cavity in the top face in the shape of the flap 24 and ring pull 25. The lower mould inserts 31, 32 are surrounded by a stripper plate 33. The stripper plate defines an annular recess 34 around each lower mould insert 31, 32. The annular recess 34 is of a diameter to receive the peripheral cover hook 14 of each can end shell 13 and hold the shell in correct location relative to the lower mould inserts 31, 32.

The upper tool 26 comprises a flanged block 35 provided with bores to accommodate pressure pads 36 and upper mould portions 37, 38 aligned respectively with lower mould inserts 32, 31. The bores in the flanges of block 35 are provided with linear bearing sleeves 39 so that the flanged block 35 is accurately guided to the hollow block 29.

Each pressure pad is resiliently urged, by a spring 40 located behind it in its bore, to push the peripheral cover hook of the can end shell into the annular recess 14. This centring action is preferably done before the upper and lower moulds clamp too firmly on the can end shell 13.

Each upper mould portion 37, 38 has a lower face defining a cavity to mould the shape of the first and second plug portions 22, 23 of the closure 21 as shown in FIGS. 4a and 4b. The periphery of each mould portion 37, 38 is shown to fit within the antipeaking bead 15 of each can end shell 13 which is a convenient arrangement permitting sealing engagement. However, more localised areas of sealing may be used if desired.

Each of the upper mould portions 37, 38 is retained in a stepped bore of the flanged block 35 by a stud 41, the head 42 of which is above a ledge 43 so that each upper mould portion is prevented from falling out of its bore. Between the top of each upper mould portion 37, 38 and the ledge 43 is located a spring 44 which urges each upper mould portion in a direction out of its bore. As the spring is to deliver the clamping pressure on the can end a strong spring, such as a stack of "Belville" washers is desirable.

It will be understood from FIG. 2 that each upper mould portion 37, 38 is resiliently supported in its bore so that when the upper tool 26 is closed upon the lower tool 27, each upper mould portion is able to cooperate with its respective lower mould insert to exert a clamping pressure on the can end therebetween. An upper mould portion clamping early in the tool stroke, because the metal it contacts is thick, will be able to yield until the other mould portions clamp thinner metal between them. Once all the moulds are clamped, injection of plastics material is commenced to mould the closure 21 of FIGS. 4a and 4b.

In the apparatus of FIG. 2 the clamping pressure is delivered by springs. The actual clamping pressure applied to each can end will vary a little according to how thick the metal is in each mould because thicker metal will cause more compression of the spring. This may not matter but if it does matter, the apparatus of FIG. 5 overcomes the variation by use of pressurised fluid to support each upper mould portion.

Figure 5:
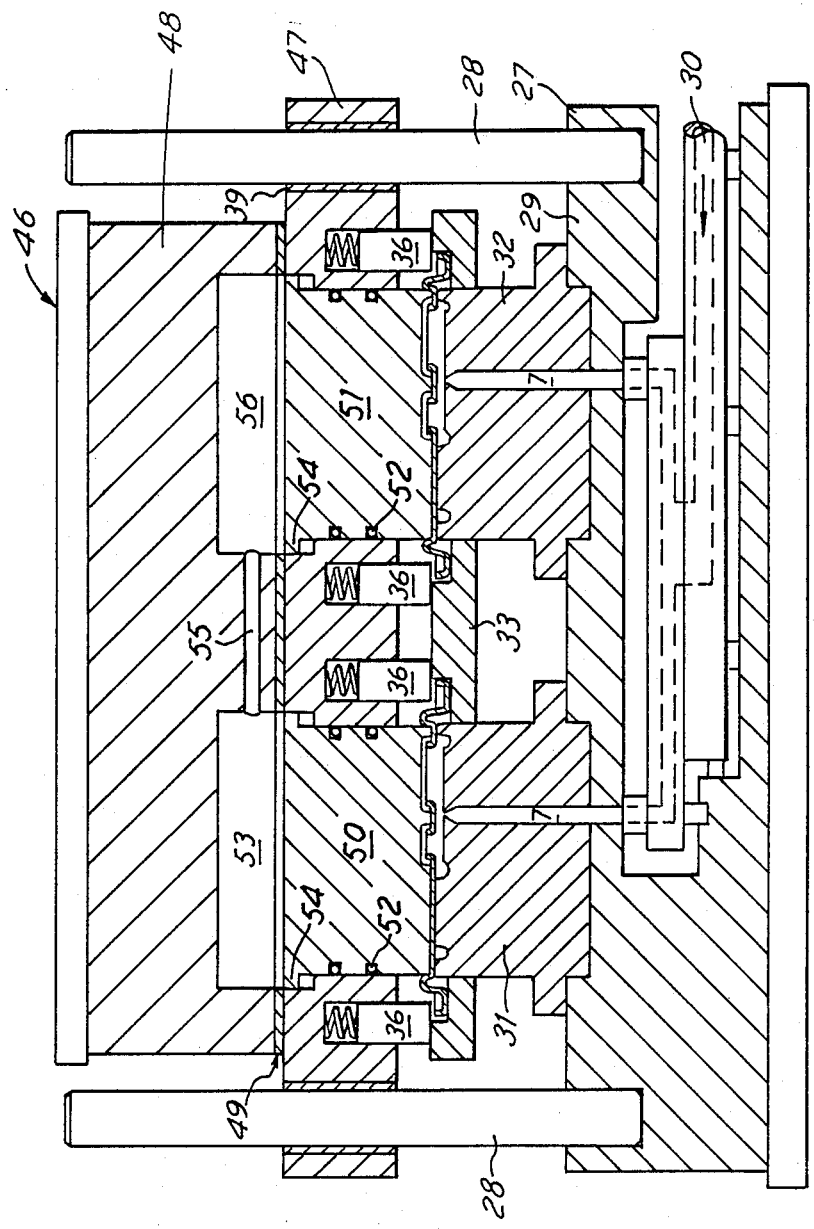
FIG. 5 is a sectioned side view of a second embodiment of apparatus for moulding a plastics plug into the can end of FIGS. 3a and 3b.

In FIG. 5 like functioning parts are denoted with the same numbers as used with reference to FIG. 2. It will be seen that the lower tool 27, pillars 28 and pressure pads 36 and linear bearings 39 are identical in both FIGS. 2 and 5 so no further description is given.

However, in FIG. 5 an upper tool 46 comprises a flange plate 47 and a cover plate 48 sealed to the flange plate by a gasket 49.

The flange plate 47 includes a bore for each of two upper moulds 50, 51. Each upper mould portion 50, 51 is provided with annular grooves in the side wall to accommodate sealing rings one of which is denoted 52. Each upper mould portion has an annular bead 54 at the top of the side wall. The bead is of a diameter greater than that of the bore so that the mould portions 50, 51 cannot fall out of the flange plate 47.

The cover plate 48 has a recess 53, 56 located over each upper mould portion 50, 51 respectively so that each upper mould portion is able to act as a piston under the influence of a compressed fluid in the recess above the upper mould portion so that each upper mould portion is able to yield to compensate for any variation in metal thickness it presses on.

Each recess 53, 56 could be connected to an independent supply of compressed fluid so that each would exert the same clamping pressure.

However, in FIG. 5, a passageway 55 connects recess 53 to recess 56. In use a desired pressure is pumped into the recesses and the system is closed. Thereafter when the upper tool is lowered onto two can ends of differing thickness the upper mould portion first contacting the thicker metal is pushed up into its recess to move compressed fluid through passageway 55 into the other recess and displace the other mould portion onto the thinner metal in contact with it. Advantages arising are that the system need only be pumped up infrequently and fewer mould parts are needed than for a system using springs.

It is not desirable to use hydraulic oils in recesses 53, 56 because any leakage past the mould portions will land in the can ends which may be used to pack foods. Accordingly it is preferable to use compressed air or other suitable hydraulic fluid.

If the mould portion movement required to compensate for metal thickness variation is only a few thousandths of an inch it may be desirable to replace the gasket 49 with diaphragm to extend across all the recesses so that mould portion movement is caused by flexure of the diaphragm. Such a closed system could use pressurised hydraulic oil and would permit relaxation of the onerous tolerances required for a sealing fit between each mould portion and its bore.

I claim:

1. Apparatus for injection moulding plastics closure elements into apertures in the central panels of a plurality of can ends, said apparatus comprising a first mould tool; a second mould tool; means effective to bring the mould tools together to clamp on opposed surfaces of each central panel and thereby define a mould cavity enclosing a margin of panel material around the aperture and spanning both sides of said aperture; and a passageway in at least one of the mould tools to permit injection of plastics material into each said mould cavity, wherein, the first mould tool includes a plurality of cavity defining mould portions each slidably guided in a respective bore in said first mould tool and resilient support means in each bore tourge each said mould portion towards the second mould tool; and the second mould tool includes a plurality of mould inserts each defining a cavity to cooperate with a cavity of a mould portion in the first tool, so that upon closing of the first mould tool to the second mould tool any mould portion closing upon a relatively thick can end panel will be urged, by the cooperating insert, to retract into its bore and permit clamping of a relatively thin can end panel between another mould portion and its cooperating mould insert, and sealing of all the moulds will be established before plastics material is injected into the mould cavity, each mould insert having a passageway through which the plastics material is injected into the mould cavities, the lower tool comprising a hollow block in which the mould inserts are seated and supported and in which a hot runner extends to convey plastics material to the passageways in the mould inserts.

2. Apparatus for injection moulding plastics closure elements into apertures in the central panels of a plurality of can ends, said apparatus comprising a first mould tool; a second mould tool; means effective to bring the mould tools together to clamp on opposed surfaces of each central panel and thereby define, for each central panel, a mould cavity enclosing a margin of panel material around the aperture and spanning both sides of said aperture; and passageways in at least one of the mould tools to permit injection of plastics material into each said mould cavity, wherein, the first mould tool includes a plurality of cavity-defining mould portions each slidably guided in a respective bore in said first mould tool and resilient support means in each bore to urge each said mould portion towards the second mould tool; and the second mould tool includes a plurality of mould inserts each defining a cavity to cooperate with a can end central panel at a location inwardly of an outermost circumference of the can end such that the outermost circumference is situated laterally outside of its respective insert, and any mould portion closing upon a relatively thick can end central panel will be urged, by the cooperating insert, to retract into its bore and permit clamping of a relatively thin can end central panel between another mould portion and its cooperating mould insert, and sealing of all the moulds will be established before plastics material is injected into the mold cavity; and a stripper plate surroundingg the mould inserts and formed with an annular recess situated laterally outside of and around each insert to receive the outermost circumference of a respective can end to hold the can end in correct location during clamping of the can end between a mould portion and a mould insert prior to injection moulding.

3. Apparatus according to claim 1, wherein resiliently mounted pressure pads carried by the upper mould tool are provided to urge the outermost peripheries of the can ends into the respective annular recesses.

4. Apparatus according to claim 2, including a passageway in each insert for injecting resin into each mould cavity.

5. Apparatus according to claim 4 wherein the lower tool comprises a hollow block in which the mould inserts are seated and supported and in which a hot runner extends to convey plastics material to the passageways in the mould inserts.

6. Apparatus according to claim 2, wherein the resilient support means is at least one Belville washer in each bore.

7. Apparatus according to claim 6, wherein mould portion and Belville washer are held in the bore by a stud screwed into the mould portion which extends through the washer to a head larger than the diameter of a hole in an annular ledge.

8. Apparatus according to claim 2, wherein the resilient support means is a pressurised fluid acting upon an end face of each mould portion, each bore communicating with a shared source of pressurised fluid.

9. Apparatus according to claim 8, wherein a flexible diaphragm separates the pressurised fluid from the end face of each mould portion.

* * * * *